(12) United States Patent
Lee et al.

(10) Patent No.: US 10,214,239 B2
(45) Date of Patent: Feb. 26, 2019

(54) PARKING ASSISTANCE APPARATUS AND METHOD OF CONTROLLING THE SAME

(71) Applicant: Hyundai Mobis Co., Ltd., Yongin-si (KR)

(72) Inventors: Seong soo Lee, Yongin-si (KR); Sang kook Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 86 days.

(21) Appl. No.: 15/227,268

(22) Filed: Aug. 3, 2016

(65) Prior Publication Data

US 2017/0036695 A1    Feb. 9, 2017

(30) Foreign Application Priority Data

Aug. 3, 2015    (KR) .................. 10-2015-0109645

(51) Int. Cl.
*B62D 15/02* (2006.01)
*B60R 1/00* (2006.01)

(52) U.S. Cl.
CPC ............ *B62D 15/0285* (2013.01); *B60R 1/00* (2013.01); *B62D 15/027* (2013.01); *B60R 2300/607* (2013.01); *B60R 2300/806* (2013.01)

(58) Field of Classification Search
CPC .... B62D 15/0285; B62D 15/027; B60R 1/00; B60R 2300/607; B60R 2300/806
See application file for complete search history.

(56) References Cited

U.S. PATENT DOCUMENTS

| | | | | |
|---|---|---|---|---|
| 8,085,167 | B2* | 12/2011 | Tanaka ............... | B62D 15/0285 180/204 |
| 8,378,850 | B2* | 2/2013 | Toledo ............... | B62D 15/0285 340/435 |
| 2007/0057816 | A1* | 3/2007 | Sakakibara .......... | B62D 15/027 340/932.2 |
| 2007/0250901 | A1* | 10/2007 | McIntire ............ | H04N 7/17318 725/146 |
| 2009/0273563 | A1* | 11/2009 | Pryor ..................... | B60K 35/00 345/157 |
| 2014/0163862 | A1* | 6/2014 | Choi ...................... | G01C 21/26 701/400 |
| 2014/0309806 | A1* | 10/2014 | Ricci ....................... | B60Q 1/00 701/1 |
| 2014/0309870 | A1* | 10/2014 | Ricci ....................... | H04W 4/21 701/36 |
| 2014/0379442 | A1* | 12/2014 | Dutta .................... | G07F 17/246 705/13 |

* cited by examiner

*Primary Examiner* — Behrang Badii
*Assistant Examiner* — Daniel L Greene
(74) *Attorney, Agent, or Firm* — H.C. Park & Associates, PLC

(57) ABSTRACT

Exemplary embodiments disclose a parking assistance apparatus and a method of controlling the same, including, displaying an around view monitoring (AVM) image for a predetermined range from a vehicle on a touchscreen, sensing a touch input for a region in which the AVM image is displayed, and setting a target parking region of the vehicle based on a type and a pattern of the touch input.

13 Claims, 21 Drawing Sheets

PARKING ASSISTANCE APPARATUS AND METHOD OF CONTROLLING THE SAME

CROSS-REFERENCE TO RELATED APPLICATION

This application claims priority from and the benefit of Korean Patent Application No. 10-2015-0109645, filed on Aug. 3, 2015, which is hereby incorporated by reference for all purposes as if fully set forth herein.

BACKGROUND

Field

The present disclosure relates to a parking assistance apparatus and a method of controlling the same.

Discussion of the Background

A vehicle refers to an apparatus that transports people, cargo, and the like from one place to another. Recently, a parking assistance apparatus has been developed and commercialized as a technological development for increasing the convenience of a vehicle user.

The parking assistance apparatus recognizes a parking space around a vehicle to inform a driver of whether parking is possible and, when necessary, outputs a dangerous situation alarm to a user using a sound signal or an optical signal. In some cases, the parking assistance apparatus is in charge of control of steering and speed for parking.

To implement the parking assistance apparatus, at least one sensor for recognizing a parking space, such as an ultrasonic sensor, needs to be installed in the vehicle.

In order for a conventional parking assistance apparatus using the ultrasonic sensor to recognize a parking space, an obstacle such as another vehicle should be present around a space in which a user desires to park a vehicle. If no obstacles are present around the vehicle of the user, parking may be impossible or parking may be performed in an incorrect region having a big difference from user intention.

Accordingly, a technique for accurately recognizing a region in which parking is possible, irrespective of whether an obstacle is present, and providing a parking guide for the parking region is needed.

For convenience and safety of a driver, an around view monitoring (AVM) system has also recently been commercialized, and attempts have been made to recognize a parking region using an AVM image and provide information about the recognized parking region to a user.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a parking assistance apparatus capable of accurately recognizing a target parking region even when there is no obstacle around a vehicle by setting a target parking region using an AVM image and guiding a parking path for a set target parking region and a method of controlling the same.

Exemplary embodiments also provide a parking assistance apparatus capable of setting a desired region to a target parking region by causing a user to touch an AVM image and a method of controlling the same.

Additional aspects will be set forth in the detailed description which follows, and, in part, will be apparent from the disclosure, or may be learned by practice of the inventive concept.

An exemplary embodiment discloses a method of controlling a parking assistance apparatus, including displaying an around view monitoring (AVM) image for a predetermined range from a vehicle on a touchscreen, sensing a touch input for a region in which the AVM image is displayed, and setting a target parking region of the vehicle based on a type and a pattern of the touch input.

The method may further include setting a parking method of the vehicle.

The setting the parking method of the vehicle may include displaying menu items for receiving any one of a plurality of predefined parking methods on the touchscreen, and setting any one of the parking methods to the parking method of the vehicle based on user selection of the menu items.

The parking method may be any one of head-in parking, back-in parking, and parallel parking.

The type of the touch input may be any one of a single touch touching one point on the touchscreen and multiple touches simultaneously touching two or more points on the touchscreen.

Setting the target parking region of the vehicle may include displaying a first guide image in a region corresponding to a location at which the touch input is sensed, the first guide image having a preset size and a preset shape based on specifications of the vehicle, and setting a region in which the first guide image is displayed to the target parking region if the touch input is completed.

Displaying the first guide image may include displaying the first guide image after moving a location at which the first guide image is displayed to an upper, lower, right, or left side based on a dragged distance and direction of the single touch if the touch input is a single touch dragged on the touchscreen.

Displaying the first guide image may include displaying the first guide image after rotating the first guide image clockwise or counterclockwise based on a pattern of the multiple touches if the touch input is multiple touches.

The method may further include generating a visual effect in the first guide image when the target parking region is set.

Displaying the first guide image may include displaying the first guide image after rotating the first guide image such that a center line of the first guide image makes an angle of 90 or 180 degrees in relation to a direction of the parking line if a parking line is present in the AVM image.

The method may further include generating a parking path from a current location of the vehicle to the target parking region.

The method may further include displaying a second guide image corresponding to the parking path by overlapping the AVM image.

The method may further include controlling a steering of the vehicle based on the parking path.

Another exemplary embodiment provides a parking assistance apparatus which includes a touchscreen configured to display an around view monitoring (AVM) image for a predetermined range from a vehicle on a touchscreen and senses a touch input for a region in which the AVM image is displayed, and a controller configured to set a target parking region of the vehicle based on a type and a pattern of the touch input.

The touchscreen may be configured to display menu items for receiving any one of a plurality of predefined parking methods on the touchscreen and the controller may be configured to set any one of the parking methods to the parking method of the vehicle based on user selection of the menu items.

The parking method may include any one of head-in parking, back-in parking, and parallel parking.

The touchscreen may be configured to display a first guide image in a region corresponding to a location at which the touch input is sensed, the first guide image having a preset size and a preset shape based on specifications of the vehicle, and the controller may be configured to set a region in which the first guide image is displayed to the target parking region when the touch input is completed.

The controller may be configured to display the first guide image after moving a location at which the first guide image is displayed to an upper, lower, right, or left side based on a dragged distance and direction of the single touch if the touch input is a single touch dragged on the touchscreen.

The controller may be configured to display the first guide image after rotating the first guide image clockwise or counterclockwise based on a pattern of the multiple touches if the touch input is multiple touches.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
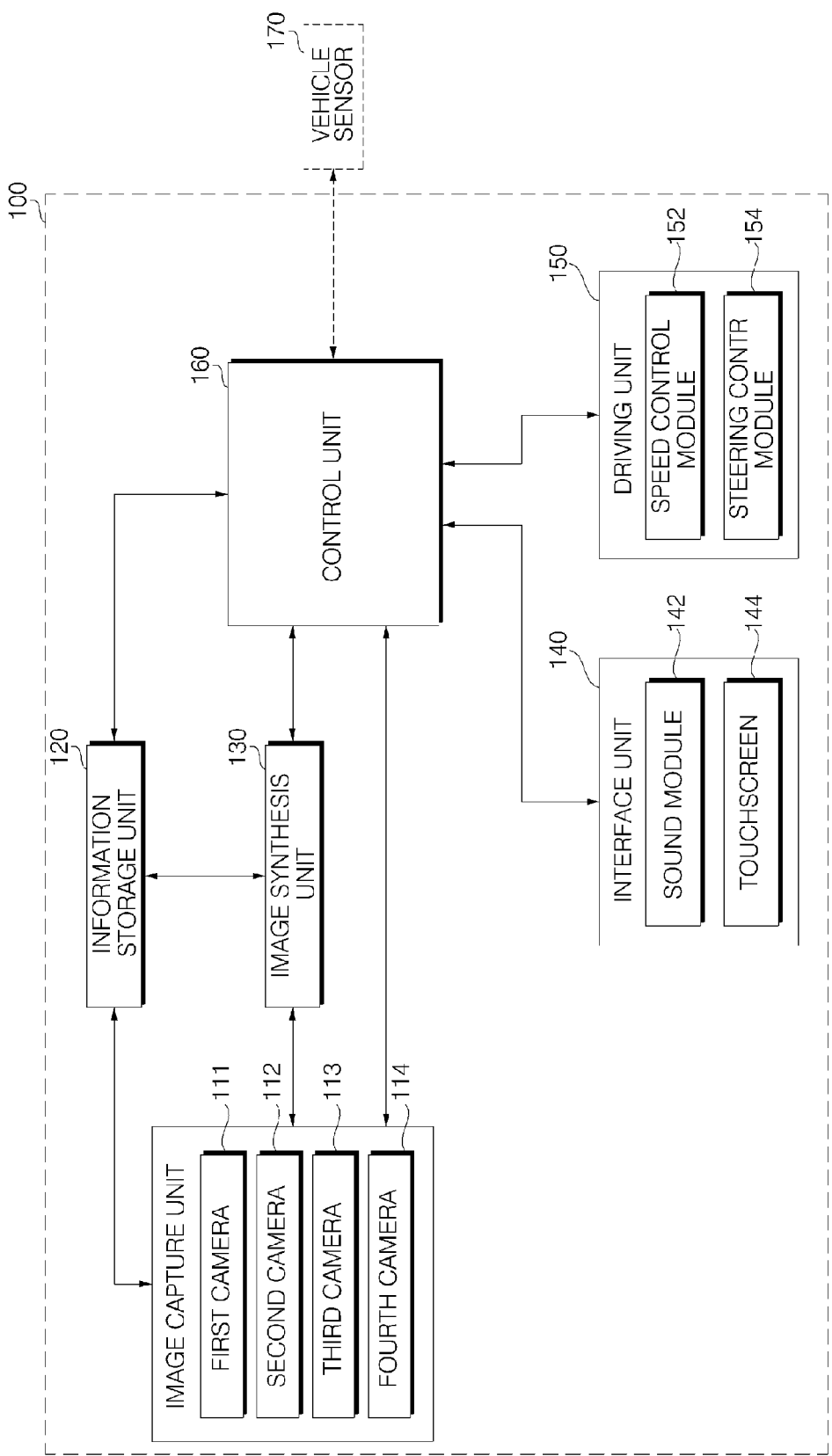
FIG. 1 is a block diagram of a parking assistance apparatus 100 according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of panels, regions, etc., may be exaggerated for clarity and descriptive purposes. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, and/or sections, these elements, components, regions, and/or sections should not be limited by these terms. These terms are used to distinguish one element, component, region, and/or section from another element, component, region, and/or section. Thus, a first element, component, region, and/or section discussed below could be termed a second element, component, region, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2A:
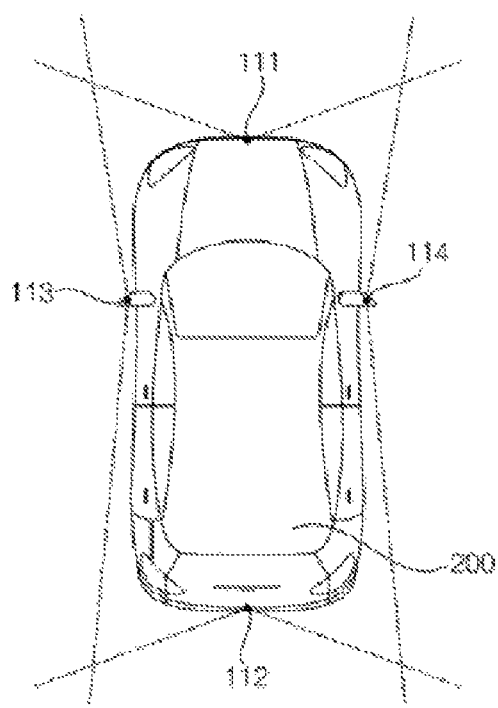
FIG. 2A illustrates the location of a plurality of cameras according to an exemplary embodiment.
Figure 2B:
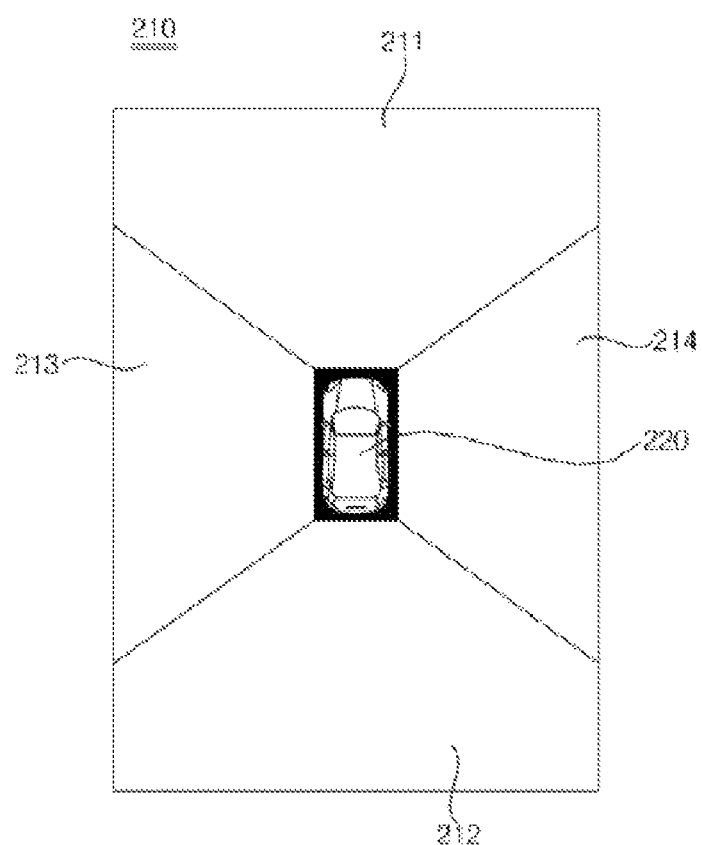
FIG. 2B illustrates an exemplary AVM image generated by the parking assistance apparatus according to an exemplary embodiment.

FIG. 1 is a block diagram of a parking assistance apparatus 100 according to an exemplary embodiment. FIG. 2A illustrates the location of a plurality of cameras according to an exemplary embodiment. FIG. 2B illustrates an exemplary AVM image generated by the parking assistance apparatus 100 according to an exemplary embodiment.

Referring to FIG. 1, the parking assistance apparatus 100 according to an exemplary embodiment includes an image capture unit 110, an information storage unit 120, an image synthesis unit 130, an interface unit 140, a driving unit 150, and a control unit 160.

The image capture unit 110 captures images of the surroundings of a vehicle and generates surrounding images for a predetermined range based on the vehicle.

The image capture unit 110 may include a plurality of cameras 111 to 114 as illustrated in FIG. 1 and FIG. 2A. Each of the cameras 111 to 114 may be any one of a mono camera, a stereoscopic camera, and an infrared camera.

The four cameras 111 to 114 may be installed at a front, rear, left, and right sides of a vehicle 200 and may generate a front view image 211, a rear view image 212, a left side view image 213, and a right side view image 214, respectively.

The multiple images 211 to 214 may be synthesized by the image synthesis unit 130 which will be described later and may be transformed into an AVM image 210 similar to looking at the vehicle 200 from above.

In this case, a virtual image 220 corresponding to the vehicle 200 may be displayed in one region of about a center of the AVM image 210 as illustrated in FIG. 2B. The virtual image 220 may be prestored in the information storage unit 120. The size of the virtual image 220 may be enlarged or reduced by the control unit 160 based on specification information of the vehicle 200 (e.g., the whole width and the whole length of the vehicle 200) prestored in the information storage unit 120 and on the size of a touchscreen 144, which will be described later, and then may be displayed on the touchscreen 144.

The information storage unit 120 stores information regarding a parking space and a vehicle. Specifically, the information storage unit 120 may permanently or temporarily store the surrounding images captured by the image capture unit 110.

In addition, the information storage unit 120 may store control commands for controlling at least one of speed and steering of a vehicle along a parking path, temporarily store various programs for operation of the control unit 160 or input/output data, provide at least part of various prestored information to the control unit 160 at the request of the control unit 160, prestore various images or alarm messages to be generated by the interface unit 140, which will be described later, and may store internal parameters and external parameters for the cameras 111 to 114.

The information storage unit 120 may also store view transformation information. The view transformation information may be information for transforming or reflecting information about any one view into information about another view, for example, information for transforming the surrounding images generated by the cameras 111 to 114 into an AVM image or information for mutual transformation between a 3D space and a 2D plane.

The information storage unit 120 may store an actual distance value per pixel of the touchscreen 144. Then, the control unit 160 may determine by how much distance any one point of an AVM image displayed on the touchscreen 144 is actually separated from the vehicle 200. This will be used during generation of a parking path which will be described later.

The information storage unit 120 may store path information of a parking path generated by the control unit 160.

The image synthesis unit 130 may synthesize images provided by the cameras 111 to 114. The image synthesis unit 130 may generate the AVM image 210 by synthesizing the front view image 211, the rear view image 212, the left side view image 213, and the right side view image 214 as illustrated in FIG. 2B.

The interface 140 generates various information related to a vehicle or a parking space in the form of a signal capable of being recognized by a user. The interface 140 may also receive various commands from a user, and may include a sound module 142 and the touchscreen 144.

The sound module 142 may generate various messages as acoustic signals using a speaker included therein, receive a voice command of a user using a microphone, convert the voice command into an electric signal, and provide the electric signal to the control unit 160.

The touchscreen 144 is a device, including a touch sensor in a screen, for outputting various information in a visual format. When a user touches the screen, the touchscreen 144 may provide an electric signal corresponding to a coordinate value of the touched point to the control unit 160. As such, the control unit 160 may determine the type and location of touch input applied by the user. The touchscreen 144 may display the above-described AVM image 210.

In addition, the touchscreen 144 senses touch input applied by a user based on various schemes such as a capacitive scheme and/or a resistive scheme.

The driving unit 150 may control the driving of a vehicle. The driving unit 150 may include a speed control module 152 and a steering control module 154.

The speed control module 152 may increase or decrease the speed of a vehicle or maintain the speed of a vehicle within a predetermined range while under control of the control unit 160, which will be described later. For example, the speed control module 152 may decrease the speed of the vehicle by utilizing a braking device included in the vehicle or adjust the speed of the vehicle by adjusting the amount of air, fuel, or power supplied to an engine.

The steering control module 154 may maintain a traveling direction (e.g., a heading angle) of the vehicle within a predetermined range while under control of the control unit 160, which will be described later. For example, the steering control module 154 may control the vehicle to not leave a boundary of a target parking space without user intervention by controlling a motor of a motor driven power steering (MDPS) device included in the vehicle.

The control unit 160 controls overall operation of the parking assistance apparatus 100. Specifically, the control unit 160 may process signals, data, and information input and output through the image capture unit 110, the information storage unit 120, the image synthesis unit 130, the interface 140, and the driving unit 150.

In addition, the control unit 160 may present information or functions to a user via an application program stored in the information storage unit 120.

The control unit 160 may generate an obstacle map of obstacles around the vehicle 200 based on the surrounding images provided from the image capture unit 110 or the AVM image 210 provided from the image synthesis unit 130. Such an obstacle map may be generated by detecting parking lines appearing in the surrounding images provided from the image capture unit 110 or the AVM image 210 provided from the image synthesis unit 130.

The control unit 160 may receive information related to the vehicle 200 from at least one sensor 170 installed in the vehicle 200. For example, the control unit 160 may receive information about the speed or steering angle of the vehicle 200 from the sensor 170.

A detailed operation of the control unit 160 will be described in detail with reference to FIGS. 3,4, 5A, 5B, 6A, 6B, 7A, 7B, 8A, 8B, 9A, 9B, 10A, 10B, 11A, 11B, 12, 13A, and 13B.

Hereinafter, a description will continue to be given with reference to FIG. 1 under the assumption that the above-described parking assistance apparatus 100 is installed in a vehicle 200 illustrated in FIG. 2A.

Figure 3:
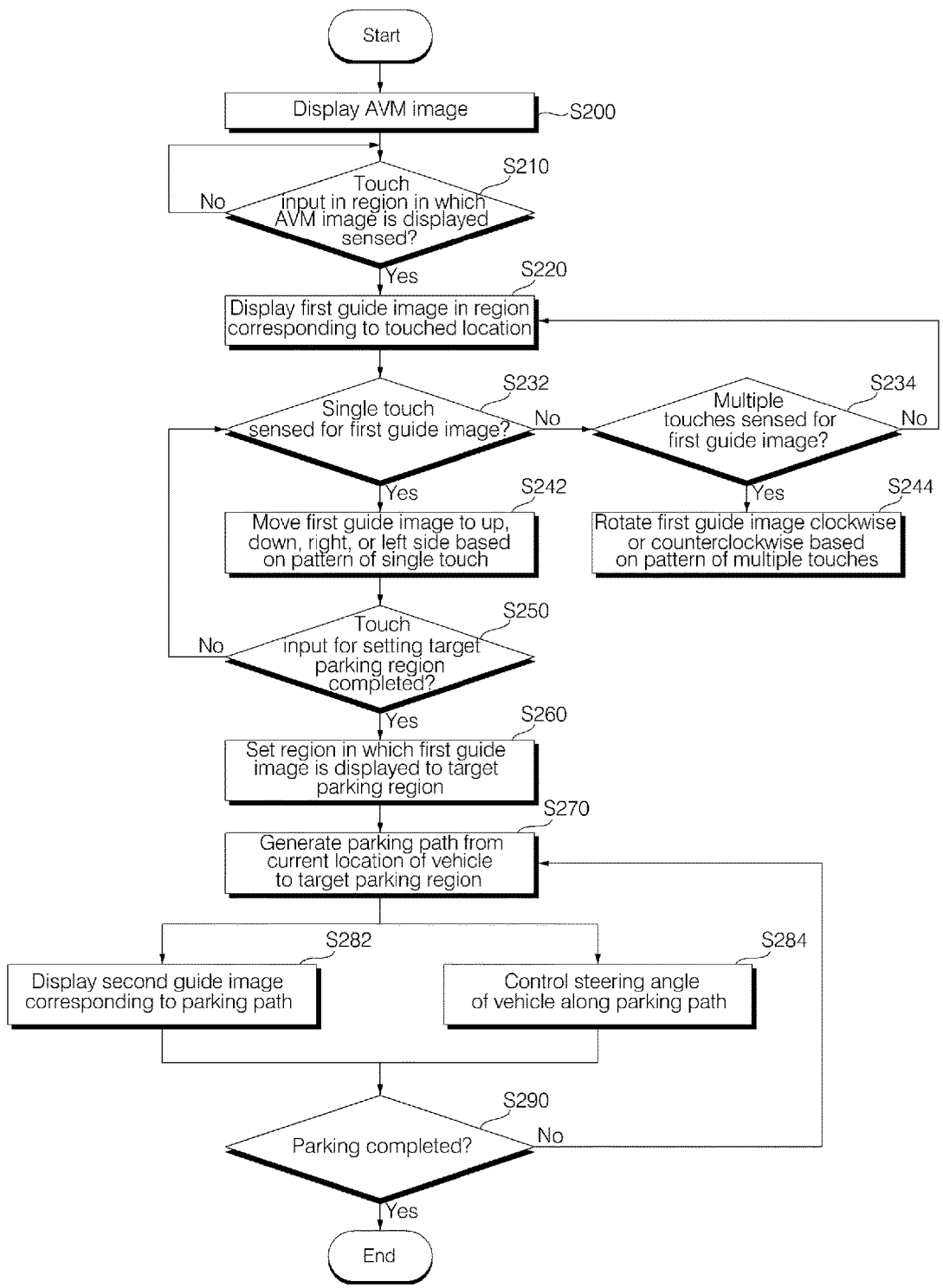
FIG. 3 is a flowchart illustrating a method of controlling the parking assistance apparatus according to an exemplary embodiment.

FIG. 3 is a flowchart illustrating a method of controlling the parking assistance apparatus 100 according to an exemplary embodiment.

Referring to FIG. 3, the control unit 160 displays an AVM image generated by the image synthesis unit 130 on the touchscreen 144 (S200). In this case, step S200 may be set to be performed only when the speed of the vehicle 200 is less than a preset threshold speed or the vehicle 200 is backing up.

The control unit 160 determines whether touch input by a user is sensed in a region in which the AVM image is displayed among the entire region of the touchscreen 144 (S210). If no touch input is sensed in step S210, the control unit 160 may repeat step S210 until touch input is sensed.

Upon sensing touch input by a user in step S210, the control unit 160 displays a first guide image in a region corresponding to a touched location (S220). The region corresponding to the touched location may be a region including the touched location. For example, the first guide image may be displayed in a rectangular region centering on the touched location.

In addition, the first guide image in the present disclosure may indicate an image displayed to set a target parking region. Since the first guide image is displayed on the touchscreen 144 together with the AVM image, the user can easily select and confirm the location of the target parking region that the user desires to set.

The first guide image may have a preset size and a preset shape based on specifications of the vehicle 200. For example, the first guide image may be displayed with the same size and shape as a virtual image 220 illustrated in FIG. 2B by overlapping the AVM image.

Next, the control unit 160 may determine whether a single touch is sensed for the first guide image displayed in step S220 on the touchscreen 144 (S232). The single touch is touch input touching only one point of the touchscreen 144 at any one time. For example, if only an electric signal corresponding to a single coordinate value is provided to the control unit 160 by the touchscreen 144, the control unit 160 may determine that the user applied a single touch input to the touchscreen 144.

Upon sensing the single touch for the first guide image in step S232, the control unit 160 may move the first guide image to an up, down, right, or left side within the AVM image based on a pattern of the sensed single touch (S242). For example, if the user applies a single touch dragged from any one point of the AVM image to another, the control unit 160 may move the first guide image to an up, down, right, or left side based on a dragged distance and direction of the single touch.

If the type of touch input sensed for the first guide image in step S232 is not a single touch, the control unit 160 may determine whether multiple touches for the first guide image are sensed (S234). The multiple touches may be a type of touch input simultaneously touching two or more points at any one time. For example, if electrical signals corresponding to two or more coordinate values are provided by the touchscreen 144 to the control unit 160, the control unit 160 may determine that the user is currently applying a multi-touch input to the touchscreen 144.

If multiple touches (i.e., a multi-touch input) for the first guide image are sensed in step S234, the control unit 160 may rotate the first guide image clockwise or counterclockwise within the AVM image based on a pattern of the sensed multiple touches (S244).

Meanwhile, while step 232 is illustrated as preceding step S234, this is purely exemplary, and step S234 may precede step S232 or steps S232 and S234 may be simultaneously performed. In addition, step S244 may precede step S242 or steps S242 and S244 may be simultaneously performed.

Next, the control unit 160 may determine whether touch input for setting the target parking region is completed (S250). For instance, if no additional touch input for the first guide image is applied for a preset time period after touch input for the first guide image is applied at any one time, the control unit 160 may determine that touch input for setting the target parking region is completed.

Alternatively, if touch input of a predetermined pattern is applied to the touchscreen 144, the control unit 160 may determine that touch input for setting the target parking region is completed. For example, upon sensing touch input of consecutively tapping a region in which the first guide image is displayed a predetermined number of times (e.g., three times) within a predetermined time period (e.g., 0.5 seconds), the control unit 160 may determine that touch input for setting the target parking region is completed.

Alternatively, upon receiving a user voice command requesting that the target parking region be set through the sound module 143, the control unit 160 may determine that touch input for setting the target parking region is completed.

Alternatively, a predetermined icon may be displayed in one region of the touchscreen 144 and, if the user touches the icon, the control unit 160 may determine that touch input for setting the target parking region is completed.

If it is determined that touch input for setting target parking region is not completed in step S250, the control unit 160 may return to step S232.

If it is determined that touch input for setting target parking region is completed in step S250, the control unit 160 may set a region in which the first guide image is currently displayed to the target parking region (S260). In this case, the control unit 160 may add a predetermined visual effect to the first guide image. For example, while the first guide image may be displayed in blue in steps prior to step S260, if step S260 is performed, the color of the first guide image may be changed to red. At least one of transparency, brightness, flickering, and other various visual effects may be applied to the first guide image.

The control unit 160 may generate a parking path from a current location of the vehicle 200 to the target parking region (S270). Since a process of generating a path from any one location to another may be implemented using widely known schemes, a detailed description thereof is omitted herein.

The control unit 160 may display a second guide image corresponding to the parking path generated in step S270 on the touchscreen 144 (S282). The second guide image may be an image corresponding to a trajectory of a linear or curved form that connects the virtual image 220 corresponding to the vehicle 200 in the AVM image and the first guide image. In this case, the control unit 160 may change the color or thickness of the second guide image according to a distance between the vehicle 200 and the target parking region. For example, as the distance between the vehicle 200 and the target parking region decreases, the control unit 160 may control the touchscreen 144 to alter the display of the second guide image.

Separately from step S282, the control unit 160 may control a steering angle of the vehicle 200 along the parking path generated in step S270 (S284). The control unit 160 may individually set the steering angle of the vehicle 200 with respect to each unit length of the parking path. Information about the steering angle per unit length set by the control unit 160 is provided to the driving unit 150, so that the vehicle 200 may travel along the parking path even though a driver does not manipulate a steering wheel.

Then, the control unit 160 may determine whether the vehicle 200 completed parking for the target parking region (S290). If it is determined that parking for the target parking region is completed because the vehicle 200 is located at the end of the parking path, the control unit 160 may terminate the control operation for parking assistance. If it is determined that parking in the target parking region is not completed because the parking path has not been completed, the control unit 160 may return to step S270.

Figure 4:
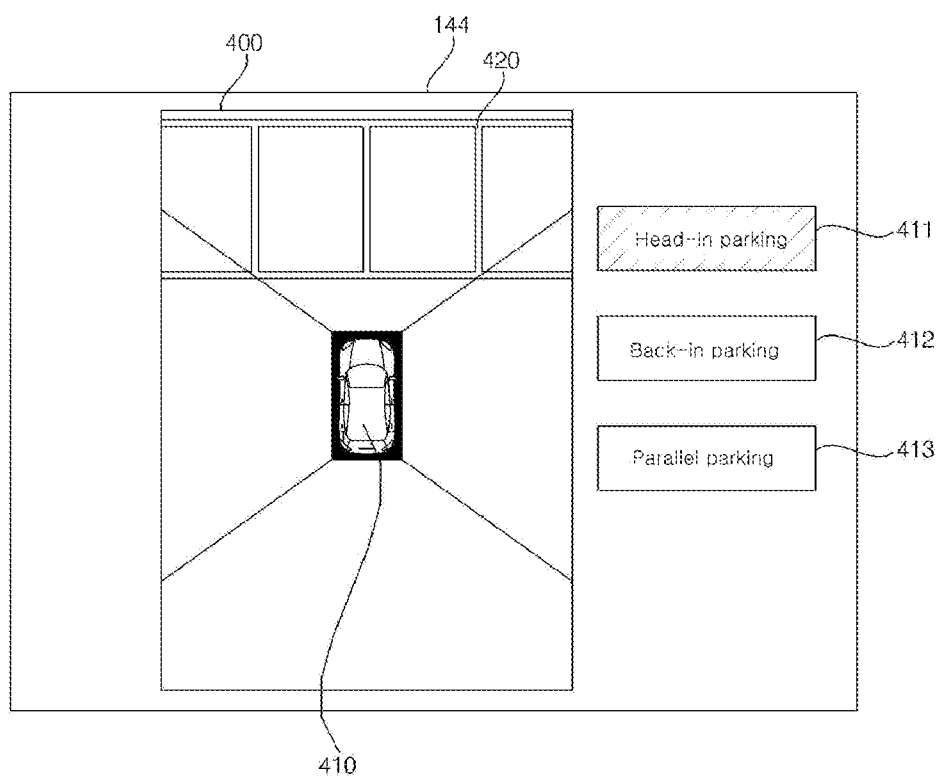
FIG. 4 illustrates an example of setting any one of a plurality of predefined parking methods in a vehicle by the parking assistance apparatus according to an exemplary embodiment.

FIG. 4 illustrates an example of setting any one of a plurality of predefined parking methods in a vehicle by the parking assistance apparatus 100 according to an exemplary embodiment.

Referring to FIG. 4, the touchscreen 144 may display an AVM image 400 in one region thereon according to control of the control unit 160 and, at the same time, display menu items 411 to 413 for receiving any one of a plurality of predefined parking methods in another region thereon.

For example, as illustrated, the first menu item 411 corresponding to a head-in parking, the second menu item 412 corresponding to back-in parking, and the third menu item 413 corresponding to parallel parking may be arranged in one region of the touchscreen 144.

A parking line 420 drawn on a road surface around the vehicle AVM image 400 is located in an upper side of the AVM image 400, and a user may confirm the location or shape of the parking line 420 appearing in the AVM image 400 displayed on the touchscreen 144 and select a desired parking scheme through touch input on any one of the menu items.

According to the parking line 420 illustrated in FIG. 4, parallel parking cannot be performed. For example, the user may select either the first menu 411 or the second menu 412. If the user selects the first menu 411 as illustrated, the control unit 160 may set head-in parking as a parking method to be applied to the vehicle 200.

Figure 5A:
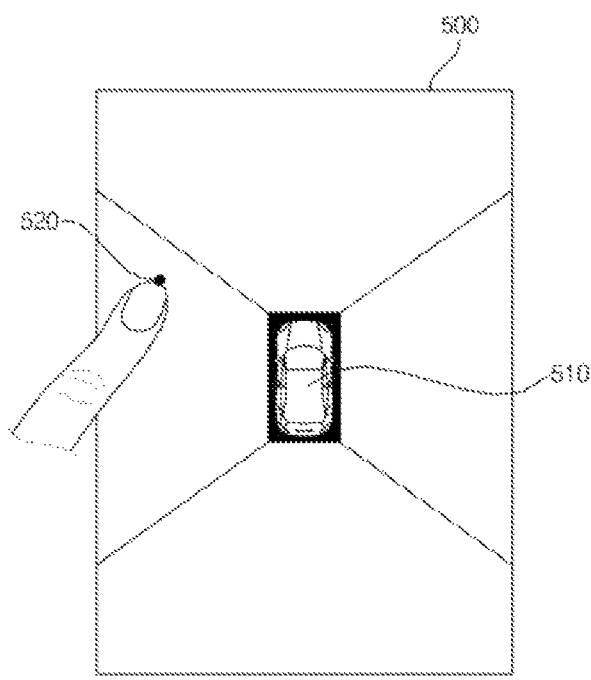
FIGS. 5A and 5B illustrate exemplary AVM images displayed to set a target parking region by the parking assistance apparatus according to an exemplary embodiment.
Figure 5B:
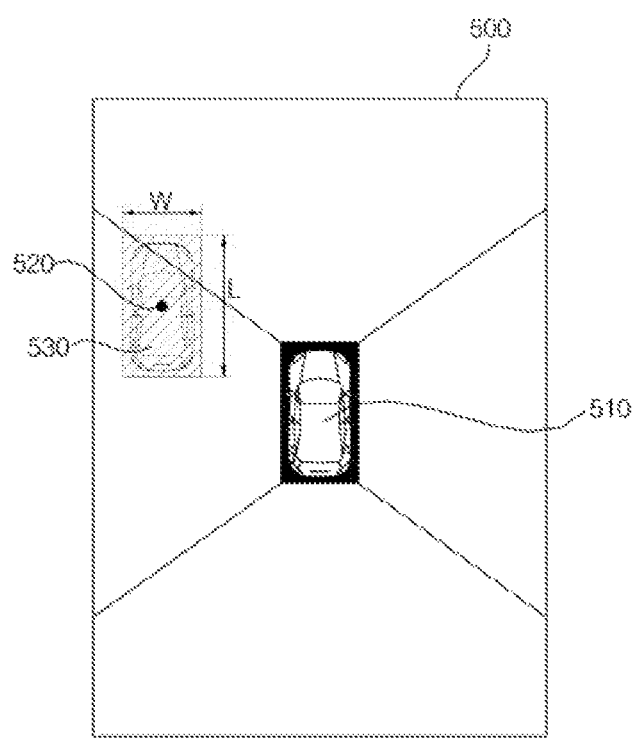

FIGS. 5A and 5B illustrate an exemplary AVM image 500 displayed to set a target parking region by the parking assistance apparatus 100 according to an exemplary embodiment.

As illustrated in FIG. 5A, if a user applies touch input to any one point 520 of the AVM image 500 displayed on the touchscreen 144, the control unit 160 may control the touchscreen 144 to display a first guide image 530 in a region corresponding to the touched point 520 as illustrated in FIG. 5B.

For example, a center coordinate of the first guide image 530 may be the same as a coordinate of the touched point 520.

In this case, the first guide image 530 may be displayed in a region having a predetermined width W and a predetermined length L as illustrated.

In addition, the first guide image 530 and a virtual image 510 may have the same size and shape, but have different colors and transparency.

As illustrated in FIG. 5B, the virtual image 510 may be displayed opaquely and the first guide image 530 may be displayed semi-transparently in the AVM image 500.

While the first guide image 530 is displayed as being arranged in a vertical direction upon being first displayed on the touchscreen 144 in FIG. 5B, the arranged state of the first guide image 530 is not limited thereto and the first guide image 530 may be displayed in a horizontal direction or displayed with a prescribed slope.

Figure 6A:
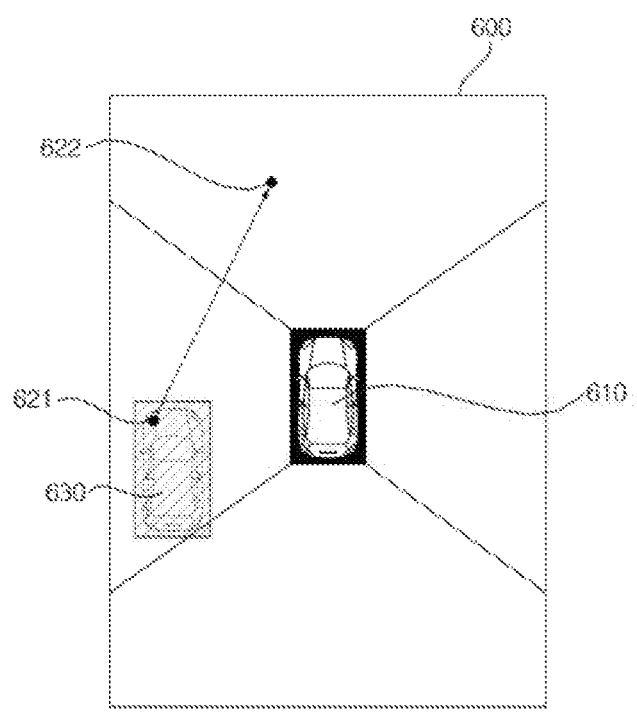
FIGS. 6A and 6B illustrate another exemplary AVM image displayed to set a target parking region by the parking assistance apparatus according to an exemplary embodiment.
Figure 6B:
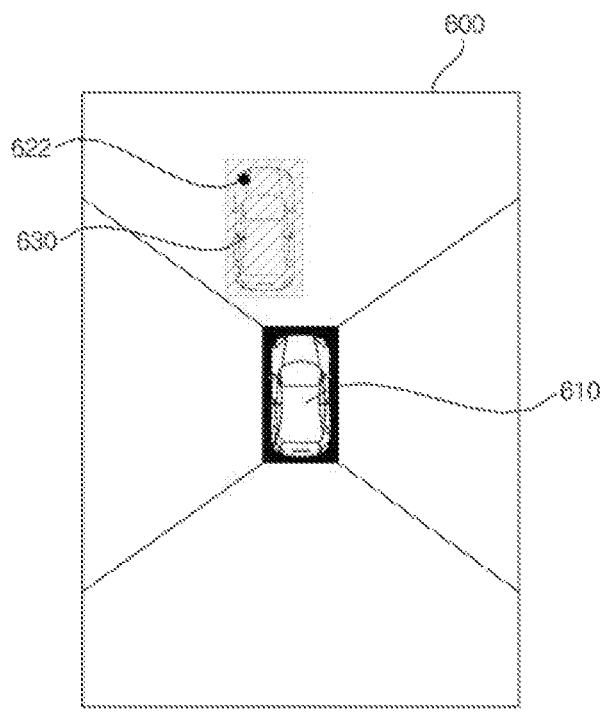

FIGS. 6A and 6B illustrate another exemplary AVM image 600 displayed to set a target parking region by the parking assistance apparatus 100 according to an exemplary embodiment.

If touch input for a first guide image 630 displayed together with the AVM image 600 is a single touch, the control unit 160 may move the first guide image 630 in any one direction of up, down, left, and right sides within the AVM image 600 based on a pattern of single touch. For convenience of description, it is assumed that the first guide image 630 and a virtual image 610 have the same shape and size.

Referring to FIG. 6A, a user may input a single touch dragged from any one point 621 within the first guide image 630 to another point 622 and, then, the first guide image 630 may be displayed within the AVM image 600 while sequentially moving up to the point 622 together with single touch.

In this case, until the single touch is ended immediately after the single touch is input, the control unit 160 may control the touchscreen 144 to boldly display the edge of the first guide image 630 as illustrated in FIG. 6A or to display the first guide image 630 with a predetermined color.

If a drag is ended at one point 622 shown in FIG. 6A, the first guide image 63 may be displayed in a region corresponding to a point at which the drag is ended as illustrated in FIG. 6B.

While a description of the case in which a single touch is dragged has been given in FIGS. 6A and 6B, a scheme of moving the location of the first guide image 630 in the AVM image 600 is not limited thereto. For example, while the first guide image 630 is displayed in a region corresponding to any one point 621 in the AVM image 600, if the user applies touch input of tapping another point 622 once in the AVM image 600, a center location of the first guide image 630 may be moved to the tapped point 622 and the first guide image 630 may be displayed in a moved location.

Figure 7A:
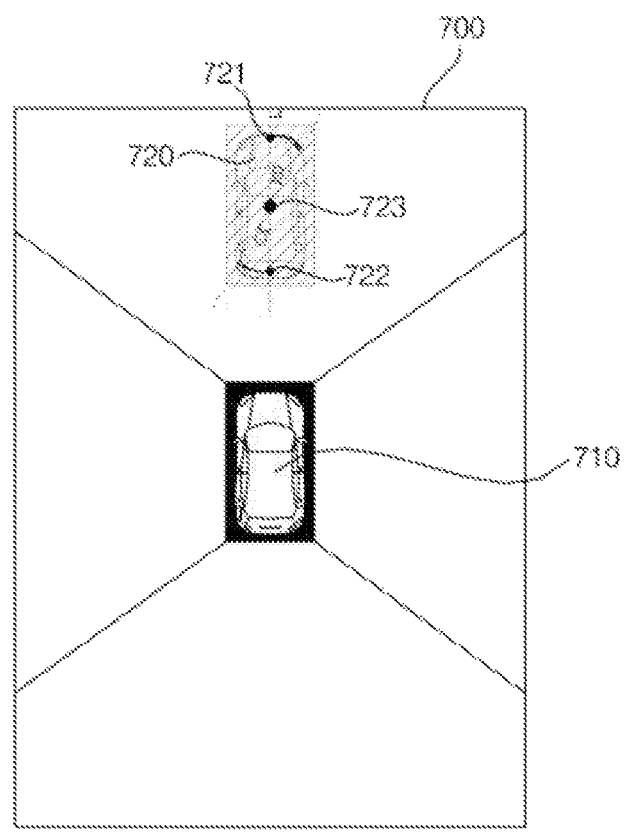
FIGS. 7A and 7B illustrate another exemplary AVM image displayed to set a target parking region by the parking assistance apparatus according to an exemplary embodiment.
Figure 7B:
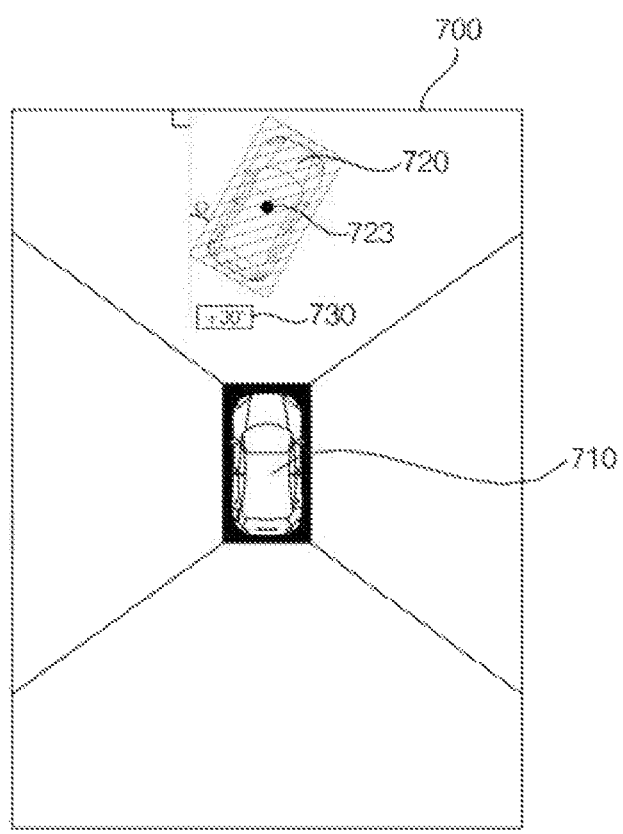

FIGS. 7A and 7B illustrate another exemplary AVM image 700 displayed to set a target parking region by the parking assistance apparatus 100 according to an exemplary embodiment.

If touch input for a first guide image 720 displayed together with the AVM image 700 is multiple touches, the control unit 160 may rotate the first guide image 720 clockwise or counterclockwise based on a pattern of the multiple touches. For convenience of description, it is assumed that the first guide image 720 and a virtual image 710 have the same shape and size.

Referring to FIG. 7A, a user may input multiple touches that simultaneously press two different points 721 and 722 in the first guide image 720. In this case, the first point 721 and the second point 722 may form a trajectory of an angle of θ in a clockwise direction centering on a center 723 of the first guide image 720.

As compared with the case prior to input of multiple touches, the first guide image 720 may be displayed in a state of being rotated clockwise by the angle of θ as illustrated in FIG. 7B. The rotation axis of the first guide image 720 may be the center location 723 of the first guide image 720.

In this case, the control unit 160 may display a message 730 indicating the amount of rotation of the first guide image 720 caused by multiple touches in one region of the touch-screen 144. For example, when θ is 30 degrees, the message 730 indicating the amount of rotation of the first guide image 720 may be a positive (+) angle value as illustrated and, when the first guide image 720 is rotated counterclockwise, the message 730 may be a negative (−) angle value.

Figure 8A:
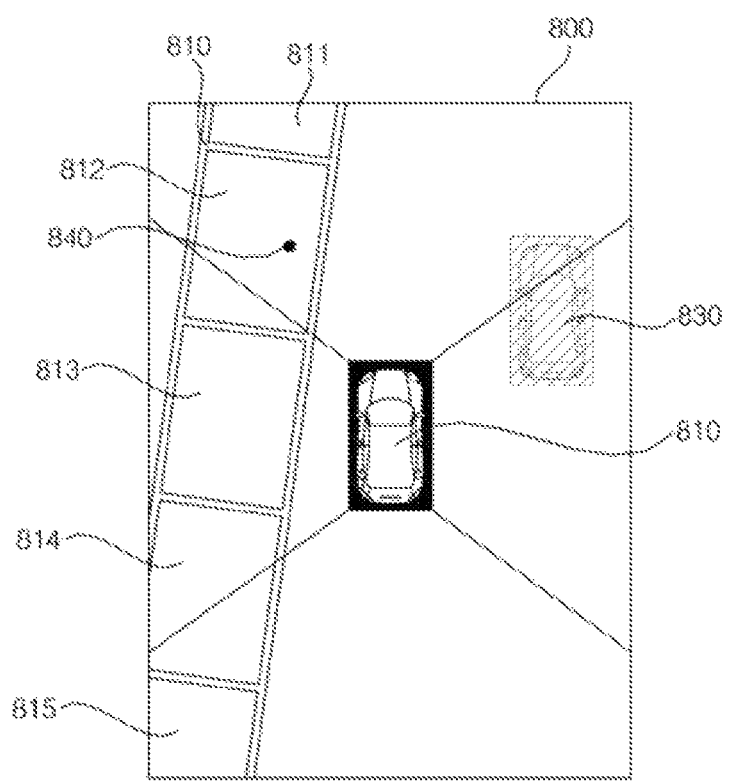
FIGS. 8A and 8B illustrate another exemplary AVM image displayed to set a target parking region by the parking assistance apparatus according to an exemplary embodiment.
Figure 8B:
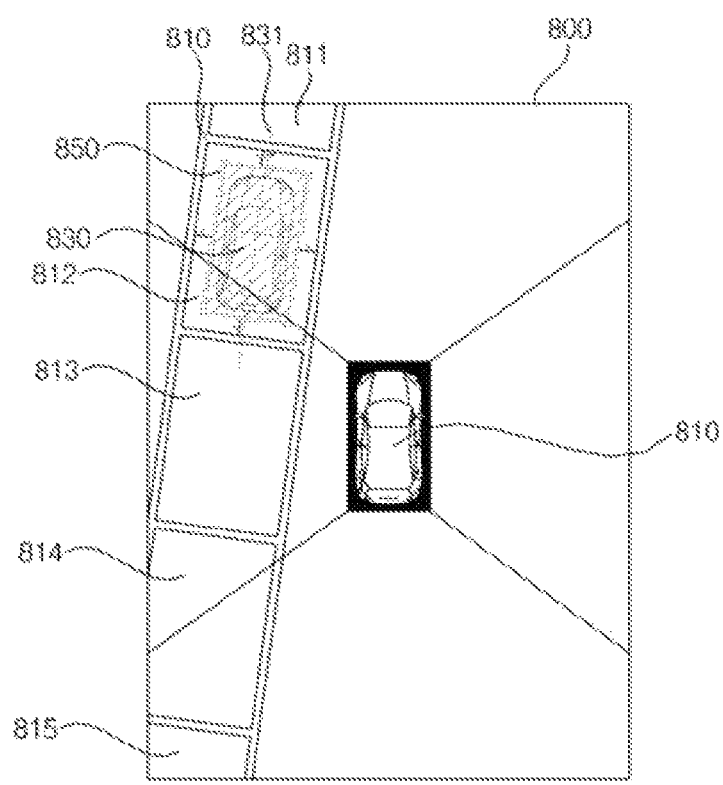

FIGS. 8A and 8B illustrate another exemplary AVM image 800 displayed to set a target parking region by the parking assistance apparatus 100 according to an exemplary embodiment.

FIG. 8A illustrates a situation in which a first guide image 830 is displayed in one region of the AVM image 800 and a parking line 820 is displayed in another region of the AVM image 800. For convenience of description, the first guide image 830 and a virtual image 810 have the same size and shape.

If the parking line 820 appears in the AVM image 800, the control unit 160 may detect a plurality of straight line components from the AVM image 800 using a line detection algorithm and recognize the parking line 820 appearing in the AVM image 800 by comparing the detected straight line components with a prestored reference pattern. Then, the control unit 160 may calculate the location, size, slope, etc. of the parking line 820 appearing in the AVM image 800. In addition, the control unit 160 may recognize parking regions 811 to 815 having the parking line 820 as a boundary from the AVM image 800. It is assumed that the parking regions 811 to 815 are rectangles as illustrated. Meanwhile, since a technique for recognizing the parking line 820 and the parking regions 811 to 815 from an image are widely known, a detailed description thereof is omitted.

As illustrated in FIG. 8A, if a user touches any one point 840 in any one parking region 812 among the parking regions 811 to 815, the first guide image 830 that has been displayed in another region of the AVM image 800 may be moved and displayed within the parking region 812 to which the touched point 840 belongs as illustrated in FIG. 8B.

In this case, the control unit 160 may display the first guide image 830 after rotating the first guide image 830 based on the slope of the parking line 820 enclosing the parking region 812. For example, if the parking region 812 is rectangle as illustrated in FIG. 8B, the control unit 160 may display, within the parking region 812, the first guide image 830 which is rotated such that a center line 831 of the first guide image 830 is orthogonal or parallel to the parking line 820 forming the boundary of the parking region 812.

In addition, the control unit 160 may display the first guide image 830 in a region 850 which is separated from the boundary of the parking region 812 by a predetermined distance ε or more.

According to FIGS. 8A and 8B, if the user touches one point 840 in one parking region 812 among the parking regions 811 to 815, since the first guide image 830 is displayed in the optimal region 850 based on the location, size, and slope of the parking region 812, user convenience is improved.

Although not illustrated, in a state in which the first guide image 830 is displayed in any one parking region 812 as illustrated in FIG. 8B, if the user touches an inner side of any one of the other parking regions 811, 813, 814, and 815, it may be easily understood by those skilled in the art that the first guide image 830 may be moved into the touched parking region and displayed.

Figure 9A:
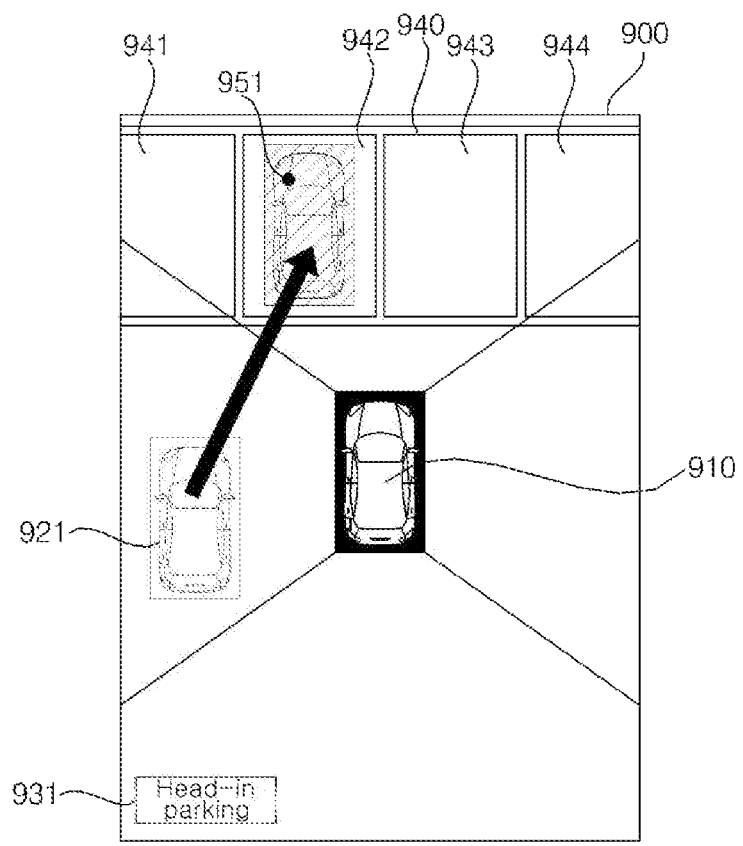
FIGS. 9A and 9B illustrate another exemplary AVM image displayed to set a target parking region by the parking assistance apparatus according to an exemplary embodiment.
Figure 9B:
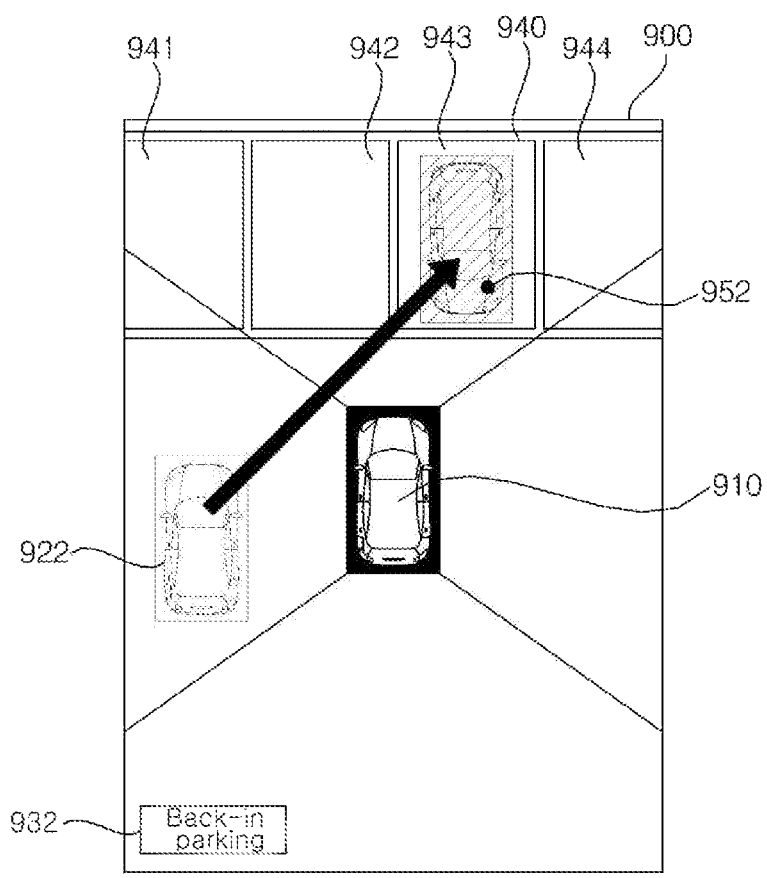

FIGS. 9A and 9B illustrate another exemplary AVM image 900 displayed to set a target parking region by the parking assistance apparatus 100 according to an exemplary embodiment.

As described with reference to FIG. 4, a user may apply any one of a plurality of predefined parking methods to the vehicle 200 during every parking operation.

FIG. 9A illustrates selection of a head-in parking method by the user. For convenience of description, it is assumed that a first guide image 921 and a virtual image 910 have the same size and shape. An indicator 931 indicating that a head-in parking method is selected may be displayed in one region of the AVM image 900. In this case, if the user touches a point 951 within any one parking region 942 among a plurality of parking regions 941 to 944 partitioned by a parking line 940, the first guide image 921 which has been displayed in one region of the AVM image 900 may be moved into the touched parking region 942. In this case, since the head-in parking method has been selected, the front and back directions of the first guide image 921 may be displayed identically to those of the virtual image 910.

FIG. 9B illustrates selection of a back-in parking method by the user. For convenience of description, it is assumed that a first guide image 922 and the virtual image 910 have the same size and shape. An indicator 932 indicating that a back-in parking method is selected may be displayed in one region of the AVM image 900. In this case, if the user touches a point 952 within any one parking region 943 among a plurality of parking regions 941 to 944 partitioned by the parking line 940, the first guide image 921 which has been displayed in one region of the AVM image 900 may be moved into the touched parking region 943. In this case, since the back-in parking method has been selected, the front and back directions of the first guide image 921 may be displayed oppositely to those of the virtual image 910.

Referring to FIGS. 9A and 9B, since the front and back directions of the first guide image are changed and displayed according to a parking method selected by the user, the user can confirm in advance the front and back directions of the vehicle 200 when parking is ended.

Figure 10A:
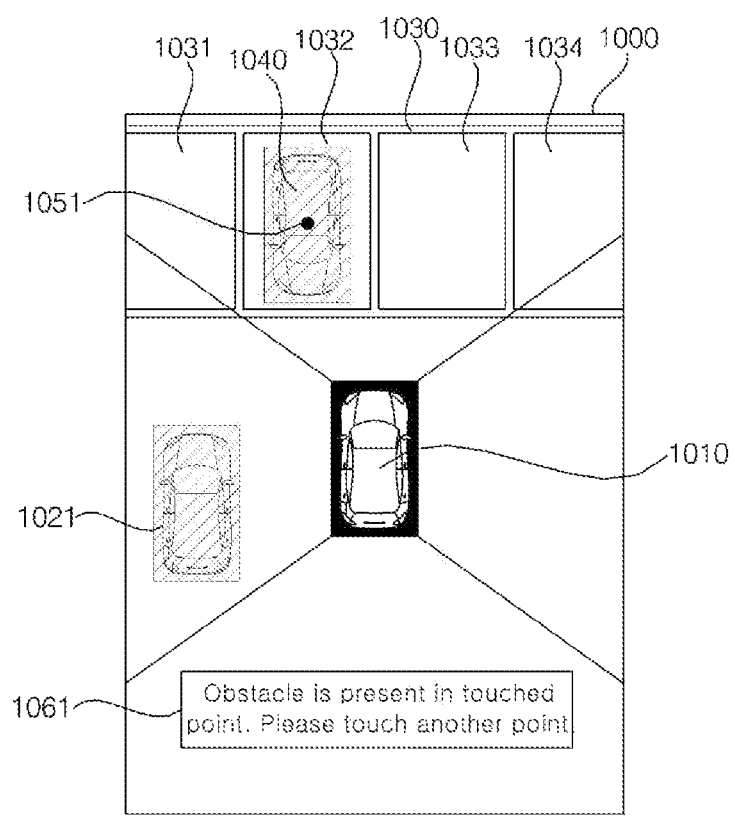
FIGS. 10A and 10B illustrate another exemplary AVM image displayed to set a target parking region by the parking assistance apparatus according to an exemplary embodiment.
Figure 10B:
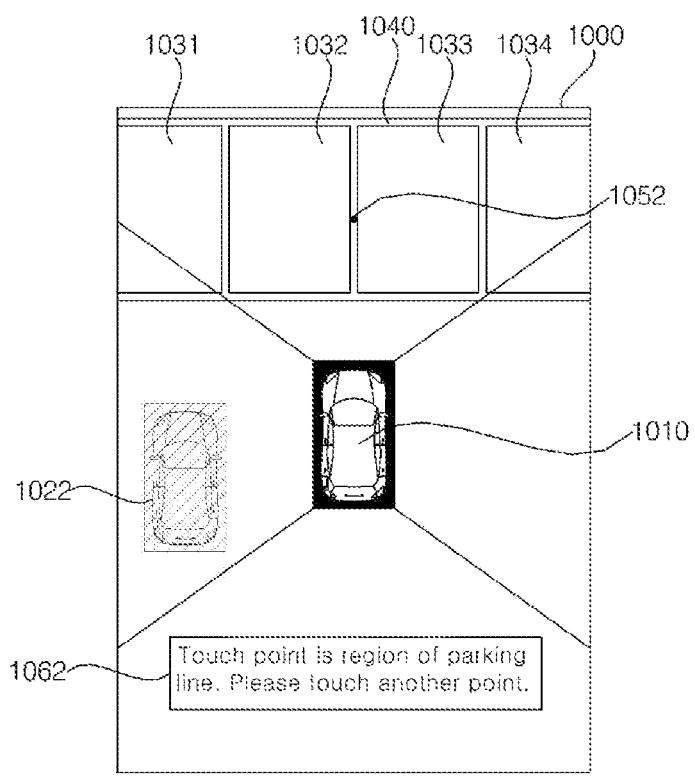

FIGS. 10A and 10B illustrate another example of an AVM image 1000 displayed to set a target parking region by the parking assistance apparatus 100 according to an exemplary embodiment. If a user touches any one point within a predefined region that cannot be set to a target parking region, the control unit 160 may display, in one region of the AVM image 1000, a message indicating that the touched region cannot be set to the target parking region.

FIG. 10A illustrates the case in which the user touches any one point 1051 within any one parking region 1032 in which a vehicle 1040 has already been parked among a plurality of parking regions 1031 to 1034 partitioned by a parking line 1030. For convenience of description, it is assumed that a first guide image 1021 and a virtual image 1010 have the same size and shape.

Since the vehicle 200 cannot be parked in a region in which another vehicle 1040 has already been parked, even if the user touches the point 1051 which is any one point within a region in which another vehicle 1040 is displayed in the AVM image 1000, the control unit 160 may control the touchscreen 144 so as not to display the first guide image 1021 moved to a region corresponding to the touched point 1051. In addition, the control unit 160 may display, in one region of the AVM image 1000, a message 1061 indicating that the first guide image 1021 cannot be displayed in a region corresponding to the currently touched point 1051. The message 1061 may disappear when a predetermined time (e.g., three seconds) elapses or another point is touched in the AVM image 1000.

FIG. 10B illustrates the case in which the user touches a point 1052 belonging to the parking line 1030. For convenience of description, it is assumed that a first guide image 1022 and the virtual image 1010 have the same size and shape.

If the first guide image 1022 is moved to a region to which the touched point 1052 belongs, an overlapping region is present between the first guide image 1022 and the parking line 1030 and, if a region in which the first guide image 1022 overlapping the parking line 1030 is displayed is set to the target parking region, this may hinder parking of another vehicle 200.

Accordingly, when the user touches the point 1052 which is any one point within a region in which the parking line 1030 is displayed in the AVM image 1000, the control unit 160 may control the touchscreen 144 so as not to display the first guide image 1022 moved to a region corresponding to the touched point 1052. In addition, the control unit 160 may display, in one region of the AVM image 1000, a message indicating that the first guide image 1022 cannot be displayed in a region corresponding to the currently touched point 1052. Such a message 1062 may disappear when a predetermined time (e.g., three seconds) elapses or another point is touched.

Figure 11A:
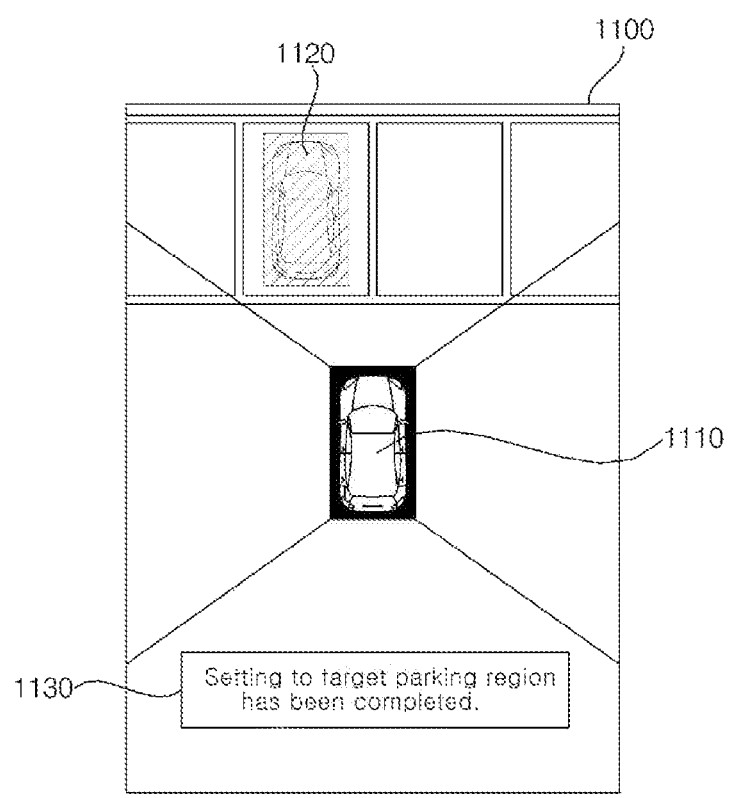
FIGS. 11A and 11B illustrate an example of an AVM image displayed when the parking assistance apparatus completes setting of a target parking region according to an exemplary embodiment.
Figure 11B:
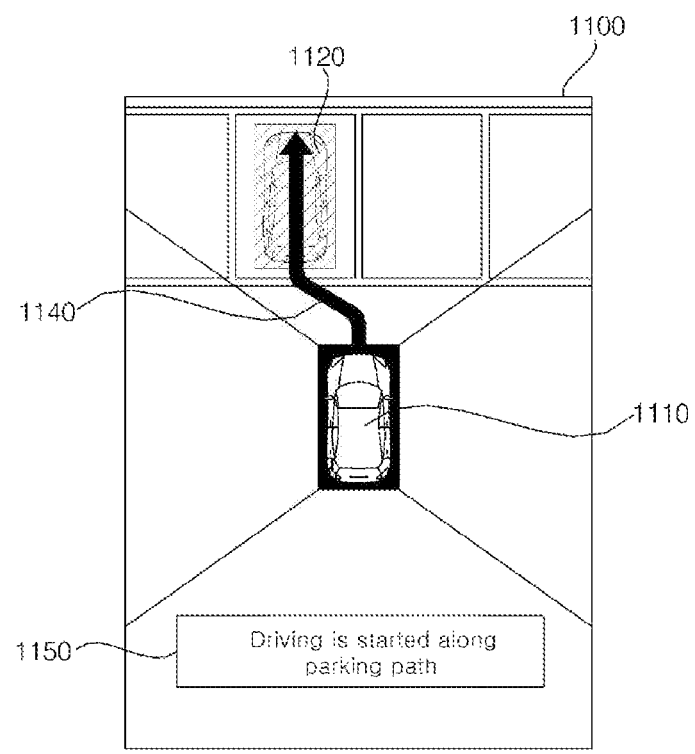

FIGS. 11A and 11B illustrate an example of an AVM image 1100 displayed when the parking assistance apparatus 100 completes setting of a target parking region according to an exemplary embodiment. For convenience of description, it is assumed that a first guide image 1120 and a virtual image 1110 have the same size and shape.

Referring to FIG. 11A, if no touch input is sensed for a predetermined time period or more from a user while the first guide image 1120 is displayed in one region of the AVM image 1100, the control unit 160 may determine that touch input for setting a target parking region is completed.

If it is determined that touch input for setting the target parking region is completed, the control unit 160 may display, in one region of the AVM image 1100, a message 1130 indicating that a region in which the first guide image 1120 is currently displayed has been set to the target parking region. In addition, the control unit 160 may display the message 1130 in one region of the AVM image 1100 and, at the same time, generate a predetermined visual effect in the first guide image 1120. For example, the first guide image 1120 may be displayed semi-transparently before it is determined that touch input for setting the target parking region is completed, whereas the first guide image 1120 may be displayed opaquely after it is determined that touch input for setting the target parking region is completed.

FIG. 11B illustrates an example of displaying, in the AVM image 1100, a second guide image 1140 for guiding a parking path for the target parking region after the region in which the first guide image 1120 is displayed is set to the target parking region as illustrated in FIG. 11A.

A user may complete parking in the target parking region by manipulating a steering wheel, a brake pedal, or an accelerator pedal while referring to the second guide image 1140 of the AVM image 1100.

Alternatively, the control unit 160 may perform automatic parking by controlling the driving unit 150 without user manipulation. In this case, a message 1150 indicating that steering control of the vehicle 200 is started may be displayed in the AVM image 1100 along a parking path corresponding to the second guide image 1140.

In addition, the second guide image 1140 may be updated in real time or periodically and then displayed in the AVM image 1100 as the vehicle 200 travels along the parking path.

Figure 12:
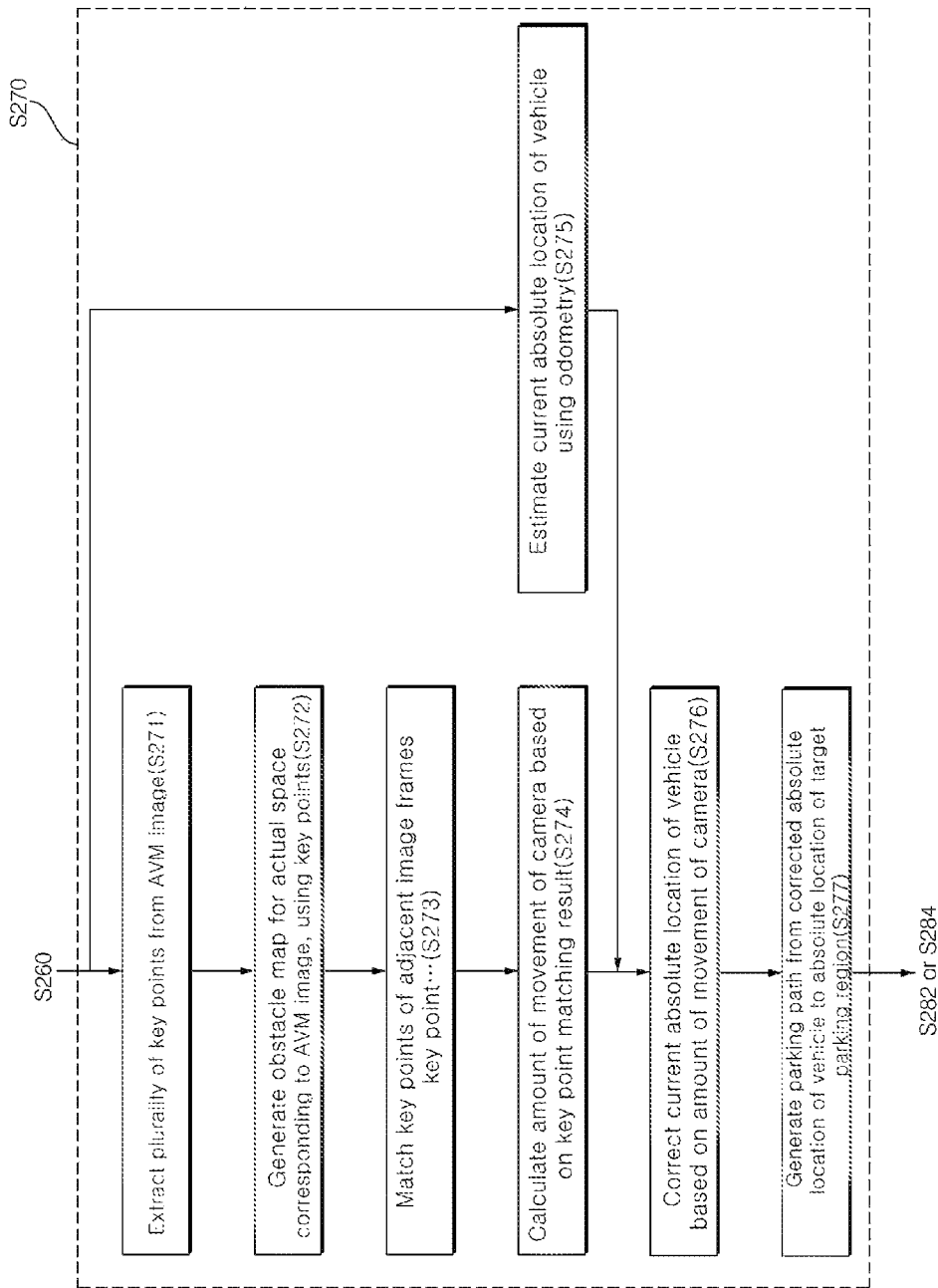
FIG. 12 illustrates an example of sub-steps included in step S270 illustrated in FIG. 3.

FIG. 12 illustrates an example of sub-steps included in step S270, illustrated in FIG. 3.

Referring to FIG. 12, if step S260 is ended, the control unit 160 may extract a plurality of key points from an AVM image (S271). The key points may indicate, for example, corners of a polygon or ends of a segment appearing in an image, which are distinguished from other parts of the image. For example, the control unit 160 may extract a plurality of key points from the AVM image using a scale invariant feature transform (SIFT), speeded up robust features (SURF), features from accelerated segment test (FAST), oriented BRIEF (ORB), binary robust invariant scalable keypoints (BRISK), or fast retina keypoint (FREAK) schemes.

The control unit 160 may generate an obstacle map for an actual space corresponding to the AVM image, using the key points extracted in step S271 (S272). The obstacle map may be a three-dimensional map, or a two-dimensional map for a plane corresponding to the ground surface.

The control unit 160 may match key points of adjacent image frames (S273). For example, the control unit 160 may match n key points in a first image frame and n key points in a second image frame adjacent to the first image frame.

As an example, the control unit 160 may calculate location variation of each key point which is commonly present in two adjacent image frames based on Equation 1.

$$x' = Rx + t \quad \text{[Equation 1]}$$
$$R = \begin{bmatrix} \cos\theta & -\sin\theta \\ \sin\theta & \cos\theta \end{bmatrix} \quad t = \begin{bmatrix} t_x \\ t_y \end{bmatrix}$$

where x is a coordinate of any one key point in a first image frame, x' is a coordinate of the same key point in a second image frame adjacent to the first image frame, θ is a rotation component between x and x', $t_x$ is a movement component on an X-axis from x to x', and $t_y$ is a movement component on a Y-axis from x to x'.

Figure 13A:
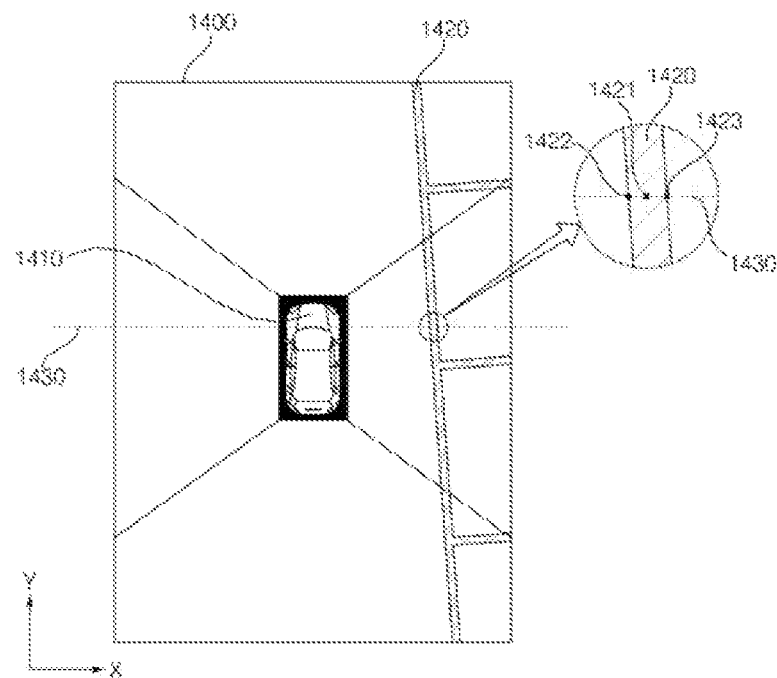
FIGS. 13A and 13B illustrate an example of extracting key points from an AVM image by the parking assistance apparatus according to an exemplary embodiment.
Figure 13B:
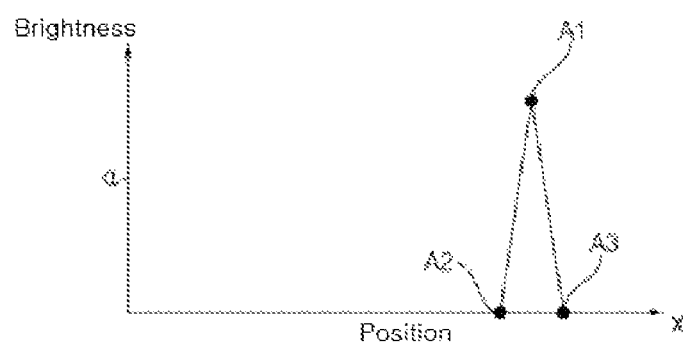

The control unit 160 may eliminate wrongly matched key points as a result of matching key points illustrated in FIG. 13A by use of random sample consensus (RANSAC), thereby obtaining a matching result as illustrated in FIG. 13B. As such, the control unit 160 can accurately calculate a location variation of each key point according to movement of the vehicle 200.

The control unit 160 may calculate the amount of movement of each of the cameras 111 to 114 based on the key point matching result in step S273 (S274). For example, if the location of a first key point moves from a first coordinate to a second coordinate in an AVM image, the control unit 160 may calculate how much each of the cameras 111 to 114 moves and where each of the cameras 111 to 114 moves, based on a difference between the first coordinate and the second coordinate. Since information about an actual distance value per pixel of the AVM image may be prestored in the information storage unit 120, the control unit 160 may transform the amount of movement of each of the cameras 111 to 114 to the amount of movement of the vehicle 200.

In addition, the control unit 160 may estimate a current absolute location of the vehicle 200 using odometry (S275). The absolute location of the vehicle 200 may mean the location of the vehicle 200 in an actual space corresponding to the AVM image.

For example, the vehicle sensor 170 may include a velocity sensor, a steering angle sensor, and a yaw rate sensor and the control unit 160 may calculate whether the vehicle 200 moves, compute the amount of movement based on sensing signals generated by the speed sensor, the steering angle sensor, and the yaw rate sensor, and factor the amount of movement in a past location of the vehicle 200, thereby estimating the current absolute location of the vehicle 200.

Meanwhile, step S275 may be simultaneously performed with step S274 or may be performed separately from S274.

Next, the control unit 160 may correct the absolute location of the vehicle 200 estimated in step S275 based on the amount of movement of each of the cameras 111 to 114 calculated in step S274 (S276).

The control unit 160 may generate a parking path from the absolute location of the vehicle 200 corrected in step S276 to an absolute location of a target parking region (S277). As such, the vehicle 200 can be easily parked in the target parking region as compared with the case of generating the parking path up to the target parking region based on the estimated location of the vehicle 200 simply using only odometry.

FIGS. 13A and 13B illustrate an example of extracting key points from an AVM image 1400 by the parking assistance apparatus 100 according to an exemplary embodiment.

Referring to FIG. 13A, the control unit 160 may transform the AVM image 1400 in which a virtual image 1410 and a parking line 1420 appear into a grayscale image and apply a Top-Hat filter along a horizontal line.

As a result of applying the Top-Hat filter along a horizontal line 1430 with respect to the AVM image 1400 transformed into the grayscale image, a value of a point 1421 having a maximum brightness may be detected. This is illustrated in FIG. 13B, where the Y-axis represents the brightness level and the X-axis represents a position along the horizontal line 1430. A point having maximum brightness may be a center point 1421 of a width direction of the parking line 1420. Alternatively, the control unit 160 may detect a center of points having brightness of a threshold α or more as the center point 1421 of the width direction of the parking line 1420. For example, when a white parking line is drawn on a road surface, a brightness value may have a maximum value at the center point 1421 of the width direction of the parking line 1420.

In addition, the control unit 160 may detect two points 1422 and 1423 located at the left side and the right side based on the center point 1421 of the parking line 1420 as key points. Then, the control unit 160 may calculate coordinates A2 and A3 of the two points 1422 and 1423 located at the boundary of the parking line 1420 illustrated in FIG. 13A.

While only one horizontal line 1430 is illustrated to aid in understanding of the present disclosure in FIG. 13A, it is apparent to those skilled in the art that the control unit 160 may calculate brightness values along a plurality of horizontal lines vertically separated by a reference interval and extract more key points than the key points illustrated in FIG. 13A.

The parking assistance apparatus and the method of controlling the same according to the present disclosure have the following effects.

According to at least one of the embodiments of the present disclosure, a target parking region can be easily set only by simple touch input for an AVM image and a parking path is guided according to the set target parking region, thereby increasing user convenience.

In addition, according to at least one of the embodiments of the present disclosure, a user can easily select a desired region as a target parking region even when a parking line is not drawn on a ground surface as well as when the parking line is drawn the ground surface.

The effects of the present disclosure should not be limited to the aforementioned effects and other not-mentioned effects will be clearly understood by those skilled in the art from the claims.

The exemplary embodiments of the present disclosure as described above are not limited to be implemented only via the apparatus and the method and may be implemented via a program that realizes a function corresponding to the configuration of each embodiment of the present disclosure or a recording medium on which the program is recorded. This implementation will be easily realized by experts in the art of the present disclosure from the above description of the embodiments.

In addition, it should be readily understood that the disclosure is not limited to the embodiments described above and the accompanying drawings. Rather, the disclosure can be modified to incorporate any number of variations, alterations, substitutions, or equivalent arrangements not heretofore described, but which are commensurate with the spirit and scope of the disclosure. Accordingly, the disclosure is not to be seen as limited by the foregoing description of the embodiments and the accompanying drawings, and some or all of the embodiments may be selectively combined with one another to achieve various alterations.

The parking assistance apparatus 100 and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like. In this manner, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. As such, parking assistance apparatus 100 and/or one or more components thereof may include or otherwise be associated with one or more memories (not shown) including code (e.g., instructions) configured to cause the parking assistance apparatus 100 and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A method of controlling a parking assistance apparatus, the method comprising:
    setting a parking method of the vehicle, wherein the setting the parking method of the vehicle comprises:
        displaying menu items for receiving any one of a plurality of predefined parking methods on the touchscreen,
        setting any one of the parking methods to the parking method of the vehicle based on user selection of the menu items, and
        the parking method is any one of head-in parking, back-in parking, and parallel parking;
    displaying an around view monitoring (AVM) image for a predetermined range from a vehicle on a touchscreen;
    sensing a touch input for a region in which the AVM image is displayed;
    setting a target parking region of the vehicle based on a type and a pattern of the touch input,
    wherein the type of the touch input is at least one selected from the group consisting of a single touch touching and dragging of one point on the touchscreen to another point on the touchscreen and a multiple touch simultaneously touching two or more points on the touchscreen.

2. The method according to claim 1, further comprising generating a parking path from a current location of the vehicle to the target parking region.

3. The method according to claim 2, further comprising displaying a second guide image corresponding to the parking path by overlapping the AVM image.

4. The method according to claim 2, further comprising controlling a steering of the vehicle based on the parking path.

5. The method according to claim 1, wherein setting the target parking region of the vehicle comprises:
    displaying a first guide image in a region corresponding to a location at which the touch input is sensed, the first guide image having a preset size and a preset shape based on specifications of the vehicle; and
    setting a region in which the first guide image is displayed to the target parking region if the touch input is completed.

6. The method according to claim 5, wherein, displaying the first guide image comprises displaying the first guide image after moving a location at which the first guide image is displayed to an upper, lower, right, or left side based on a dragged distance and direction of the single touch if the touch input is a single touch dragged on the touchscreen.

7. The method according to claim 5, wherein, displaying the first guide image comprises displaying the first guide image after rotating the first guide image clockwise or counterclockwise based on a pattern of multiple touches if the touch input is multiple touches.

8. The method according to claim 5, further comprising generating a visual effect in the first guide image when the target parking region is set.

9. The method according to claim 5, wherein, displaying the first guide image comprises displaying the first guide image after rotating the first guide image such that a center line of the first guide image makes an angle of 90 or 180 degrees in relation to a direction of the parking line if a parking line is present in the AVM image.

10. A parking assistance apparatus, comprising:
    a touchscreen configured to display an around view monitoring (AVM) image for a predetermined range from a vehicle on a touchscreen and sense a touch input for a region in which the AVM image is displayed, wherein the touchscreen is further configured to display menu items for receiving any one of a plurality of predefined parking methods on the touchscreen and the controller is configured to set any one of the parking methods to the parking method of the vehicle based on user selection of the menu items, and the parking method comprises any one of head-in parking, back-in parking, and parallel parking; and
    a controller configured to set a target parking region of the vehicle based on a type and a pattern of the touch input, wherein the type of the touch input is at least one selected from the group consisting of a single touch touching and dragging of one point on the touchscreen to another point on the touchscreen and a multiple touch simultaneously touching two or more points on the touchscreen.

11. The parking assistance apparatus according to claim 10, wherein the touchscreen is configured to display a first guide image in a region corresponding to a location at which the touch input is sensed, the first guide image having a preset size and a preset shape based on specifications of the vehicle, and the controller is configured to set a region in which the first guide image is displayed to the target parking region when the touch input is completed.

12. The parking assistance apparatus according to claim 11, wherein, the controller is configured to display the first guide image after moving a location at which the first guide image is displayed to an upper, lower, right, or left side based on a dragged distance and direction of a single touch if the touch input is a single touch dragged on the touchscreen.

13. The parking assistance apparatus according to claim 11, wherein, the controller is configured to display the first guide image after rotating the first guide image clockwise or counterclockwise based on a pattern of multiple touches if the touch input is multiple touches.

* * * * *